(12) United States Patent
Sottas et al.

(10) Patent No.: US 12,533,153 B2
(45) Date of Patent: Jan. 27, 2026

(54) ULTRASONIC TOOL AND METHOD FOR MANUFACTURING THE TOOL

(71) Applicant: BOSONIC AG, Bern (CH)

(72) Inventors: Loïc Sottas, Lausanne (CH); Laurent Torriani, Lamboing (CH); Marcel Aeschlimann, Ligerz (CH); Antoine Bonadei, Bienne (CH)

(73) Assignee: BOSONIC AG, Bern (CH)

( * ) Notice: Subject to any disclaimer, the term of this patent is extended or adjusted under 35 U.S.C. 154(b) by 499 days.

(21) Appl. No.: 17/925,639

(22) PCT Filed: May 18, 2021

(86) PCT No.: PCT/EP2021/063050
§ 371 (c)(1),
(2) Date: Nov. 16, 2022

(87) PCT Pub. No.: WO2021/233858
PCT Pub. Date: Nov. 25, 2021

(65) Prior Publication Data
US 2023/0172627 A1    Jun. 8, 2023

(30) Foreign Application Priority Data

May 18, 2020  (CH) .................... 00596/20

(51) Int. Cl.
*A61B 17/32*  (2006.01)
*A61B 17/00*  (2006.01)
*A61B 34/00*  (2016.01)
*A61B 34/30*  (2016.01)
*B26D 7/08*   (2006.01)

(52) U.S. Cl.
CPC ...... *A61B 17/320068* (2013.01); *A61B 34/30* (2016.02); *A61B 34/77* (2016.02); *B26D 7/086* (2013.01); *A61B 2017/00084* (2013.01); *A61B 2017/00526* (2013.01); *A61B 2017/320077* (2017.08); *A61B 2017/320084* (2013.01)

(58) Field of Classification Search
CPC ........ A61B 17/320068; A61B 18/0206; A61B 2017/00084; A61B 2017/00526; A61B 2017/0088; A61B 2017/32007; A61B 2017/320072; A61B 2017/320077; A61B 2017/320084; A61B 34/30; A61B 34/77
See application file for complete search history.

(56) References Cited

U.S. PATENT DOCUMENTS

| 4,515,583 A | | 5/1985 | Sorich | |
|---|---|---|---|---|
| 5,188,102 A | * | 2/1993 | Idemoto | ............ A61M 3/0279 606/45 |
| 5,695,510 A | * | 12/1997 | Hood | ............ A61B 17/320068 30/355 |

(Continued)

FOREIGN PATENT DOCUMENTS

EP    3 061 415 A1    8/2016

*Primary Examiner* — Mohamed G Gabr
*Assistant Examiner* — Khoa Tan Le
(74) *Attorney, Agent, or Firm* — Rankin, Hill & Clark LLP

(57) ABSTRACT

An ultrasonic cutting tool is designed for use in an ultrasonic instrument. The tool is a blade having a flat section manufactured from at least a first blade layer and second blade layer. The first and second blade layer each being a flat metal plate arranged in parallel to one another and bonded to one another.

43 Claims, 3 Drawing Sheets

(56) References Cited

U.S. PATENT DOCUMENTS

| | | |
|---|---|---|
| 6,165,150 A | 12/2000 | Banko |
| 6,379,371 B1 | 4/2002 | Novak et al. |
| 2002/0091404 A1* | 7/2002 | Beaupre ......... A61B 17/320068 |
| | | 606/169 |
| 2005/0165345 A1 | 7/2005 | Laufer et al. |
| 2014/0323926 A1 | 10/2014 | Akagane |
| 2015/0005774 A1 | 1/2015 | Voic et al. |
| 2015/0165240 A1* | 6/2015 | Stoddard ........ A61B 17/320092 |
| | | 606/171 |
| 2016/0263403 A1 | 9/2016 | Sawada |
| 2019/0133823 A1 | 5/2019 | Banko |
| 2020/0107853 A1 | 4/2020 | Boudreaux et al. |

\* cited by examiner

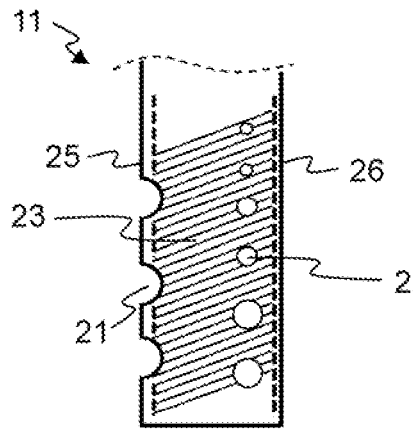
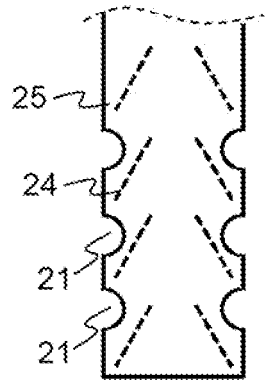
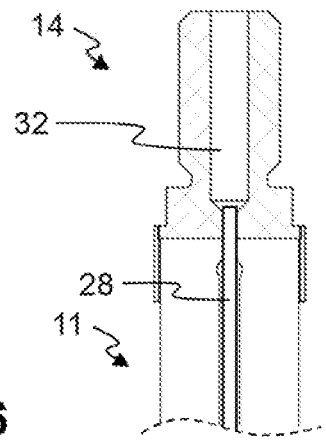
Fig. 15   Fig. 16
Fig. 18
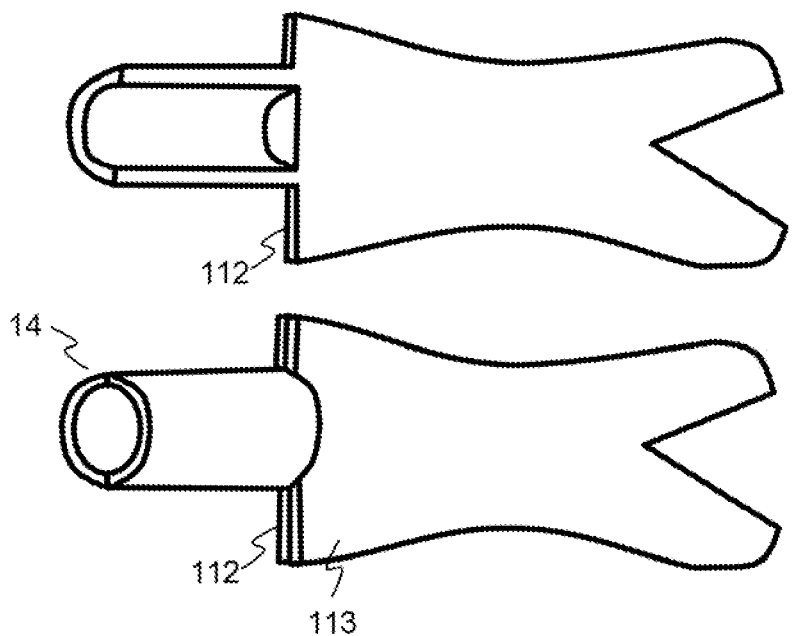
Fig. 17
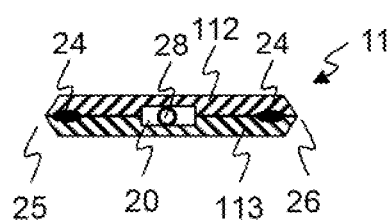
Fig. 19

ULTRASONIC TOOL AND METHOD FOR MANUFACTURING THE TOOL

BACKGROUND OF THE INVENTION

Field of the Invention

The invention relates to the field of ultrasonic instruments. It relates to an ultrasonic tool for use in an ultrasonic instrument, in particular for cutting or abrasive machining, and to a method for manufacturing the tool.

Description of Related Art

Ultrasonic instruments have a generator of ultrasonic energy and an elongated tip or tool or blade, whose proximal end receives the ultrasonic energy from the generator and conveys it to the tip distal end. Depending on the application, the distal end can be shaped for the instrument to be used as a probe and/or for penetrating soft tissue, cutting or working bone tissue etc.

It is known to provide ultrasonic tools with conduits for cooling fluid. The fluid can be water or a mixture of water with ethanol and/or a disinfectant fluid. The fluid is used to cool down the blade and to rinse away the cut material. Conduits can be double walled in order to provide for an additional conduit for aspiring fluid material, as shown in U.S. Pat. Nos. 4,515,583 and 6,165,150 A. Furthermore, it is known to have cooling water channels that branch out to a plurality if exit openings, as in U.S. Pat. No. 5,188,102 or to be made of a porous, sintered material to allow water to exit through the surface of an ultrasonic cutting blade, as in US 2015/0005774 A1. To have an efficient cooling of the blade during bone cutting is still a challenge today.

EP3061415 discloses a blade fabricated and attached to a waveguide by fabricating two halves of a blade separated along the longitudinal axis of the blade, cutting a portion of a conduit in each half of the blade, welding the two halves of the blade into a blade, and welding the blade to the distal end of the waveguide.

US2005165345 shows a three-layered electrode (two conductors separated by an insulator), to be used for electrocauterisation in a fat removal device. The electrode can take the place of a rotating blade.

U.S. Pat. No. 5,695,510 shows attachment of a blade by means of a bayonet joint with threads.

These devices are generally manufactured by elaborate or time-consuming processes such as machining or sintering, which make them costly. There is a need for ultrasonic cutting implements of simple construction that can be manufactured efficiently and economically.

SUMMARY OF THE INVENTION

It is therefore an object of the invention to create an ultrasonic tool of the type mentioned initially, which overcomes the disadvantages mentioned above. A further object is to create a method for manufacturing the tool, One advantage is that coolant and cleaning fluid is supplied from the inside of the tool. This avoids producing large jets of water in the working area, and thereby can improve visibility in the working area.

The ultrasonic cutting tool, for use in an ultrasonic instrument, the tool being a blade includes a flat section manufactured from at least a first blade layer and second blade layer, the first and second blade layer each being a flat metal plate arranged in parallel to one another and bonded to one another. Optionally, one or more further blade layers can be arranged between the first and second blade layer.

This allows creation of a thin blade, with a high degree of freedom in shaping the blade. The flat sections can be inexpensively manufactured, for example by stamping or laser cutting and/or with photochemical etching or photo-etching. Such operations can also involve creating structures on the blade layers that serve as channels (on the inside of the blade) and other structures such as teeth, for use of the tool for cutting and abrasive operations (on the outside of the blade).

The length of the tool can be, for example, between 10 mm and 100 mm, in particular between 20 mm and 80 mm, in particular between 30 mm and 60 mm. The thickness of the flat section can be between 0.3 mm or 0.5 mm and 3 mm.

The tool can be used in an ultrasonic instrument, coupled to an ultrasonic vibration generator, as a blade for cutting or abrasive machining. The tool can be cooled from the inside, by passing a coolant through the tool along the longitudinal direction. Conversely, material can be sucked from the vicinity of the tool. The flat section can be manufactured to form a cutting tool. In particular, its flat surface can be shaped to constitute a file or a rasp, and/or edges of the flat section can be shaped to constitute a file or rasp or a knife.

In embodiments, the flat section forms one or more channels suited to guide a fluid along the inside of the blade. The channels can transport cooling fluid to the distal end of the blade and/or can suck liquid or particles through the blade.

This allows to guide cooling fluid through and along the inside of the blade and in particular the flat section. This in turn can serve to cool the blade and its surroundings. Compared to external cooling, visibility in the work area is better.

The fluid being guided through the attachment region and inside the flat section makes the tool particularly suited for use in combination with a robot holding and moving the tool, since extraneous tubes or hoses for providing coolant are eliminated.

In embodiments, the first blade layer or the second blade layer or both comprise, on the face oriented towards the other blade layer, a recess defining a channel suited to guide a fluid along the blade, in particular wherein the recess is created by a subtractive process, in particular by machining or by photo-etching.

By this, there is a high degree of freedom in shaping the channel. The channel can easily be created by creating the recess on the inside of one or both layers. The shape and in particular the width of the channel can be adapted to cooling requirements, allowing for a high cooling and cleaning efficiency. Locations at which the channel exits the flat section can be defined by shaping the recess accordingly.

Etching, in particular photo-etching has advantages in that production can be easily scaled. For example, it can be performed as a roll to roll process. Recesses or cut-outs defining channels can be created at the same time as the outer contour of each layer. It is precise and cost efficient for mass production.

In embodiments, the first blade layer and second blade layer are welded to one another.

In embodiments, the flat section includes one or more weld lines, by which the first blade layer and second blade layer are welded to one another on the faces at which the first blade layer and second blade layer lie against one another.

In other words, the two blade layers are not welded to one another at their longitudinal edges, such as the first edge and second edge.

In embodiments, the weld lines run running along a longitudinal direction in which the flat section extends, and in particular one weld line running adjacent to a first longitudinal edge and another weld line running adjacent to a second longitudinal edge of the flat section.

In other embodiments, the weld lines run adjacent to the two sides of the channel.

In embodiments, the weld lines are interrupted at locations where they cross a section of the channel.

In embodiments, the flat section is joined to an attachment section for attaching the blade to an ultrasonic generator, in particular wherein the attachment section has a rotationally symmetric body.

Such a body simplifies the construction of the attachment section, in particular if the rotationally symmetric body is an attachment body around which a ring is placed, as described below.

In embodiments, the flat section is held in clamping slit of the attachment section, in particular with a press fit.

In embodiments, the flat section is bonded in the clamping slit, for example by welding, soldering or an adhesive.

In embodiments, the flat section, in a region in which it is held in the clamping slit, at least one of first blade layer and second blade layer includes a hole constituting a blade inlet in liquid communication with the channel.

This creates a conduit from the attachment section to the channel, guiding fluid into (or out of) the channel through the face of one of the blade layers.

In embodiments, the hole is in only one of the blade layers and not in the other one. This closes off the conduit in the direction opposite to a radial conduit.

In embodiments, the attachment section includes a radial conduit in liquid communication with the blade inlet, and in particular wherein the radial conduit is in liquid communication with a longitudinal conduit.

Thus, a fluid can be guided from the longitudinal conduit through the radial conduit and blade inlet into the channel, and in the opposite direction.

In embodiments, the attachment section includes an attachment body in which the clamping slit is arranged, and a ring is arranged around the attachment body, in particular to compress the attachment body.

In embodiments, the ring serves as a seal for the radial conduit.

In embodiments, a hollow conduit or needle is arranged in the channel and extends, in the longitudinal direction, from the flat section into the attachment section, with a liquid-tight connection between the hollow needle and the attachment section. Within the flat section, the hollow needle can extend to the distal end of the flat section, or at least half or three quarters of the distance from the attachment section to the distal end.

In embodiments, the attachment section includes an internal thread or an external thread.

In embodiments, the flat section includes one or more holes in fluid communication with the one or more channels.

In embodiments, one or more edges of the flat section include teeth.

In embodiments, one or more edges of the flat section are machined to constitute a cutting edge.

In embodiments, one or more edges of the flat section include one or more notches constituting openings that are in liquid communication with the one or more channels.

In embodiments, an outer surface of the flat section is shaped to include a structured surface, in particular with teeth or grooves. The structured surface can act as a file.

The presence of the teeth and/or cutting edge and/or notches and/or structured surface and/or holes can improve the efficiency of cutting and/or abrading. In particular, edges of the holes can participate in cutting and/or abrading. The holes and/or notches being in liquid communication with a channel serves to guide liquid to where the cutting and/or abrading takes place, and where the cooling effect can be most needed.

The method for manufacturing the blade includes:
providing a first blade layer and a second blade layer, at least one of them including a recess to serve as a channel in the blade;
bonding the first blade layer and second blade layer to one another, with the recess arranged between them, thereby forming a flat section of the blade;
joining the flat section to an attachment section by clamping the flat section in a clamping slit of the attachment section.

Alternatively, the method includes:
providing a first blade layer and a second blade layer and one or more further blade layers, at least one of them including a recess or a cut-out to serve as a channel in the blade;
bonding the first blade layer and second blade layer and the one or more further blade layers to one another, with the recess or cut-out arranged between the first blade layer and the second blade layer, thereby forming a flat section of the blade;
joining the flat section to an attachment section by clamping the flat section in a clamping slit of the attachment section.

In embodiments, joining the flat section to the attachment section includes heating the attachment section, inserting the flat section into a clamping slit of the attachment section, and cooling the attachment section.

In embodiments, the method includes the further step of machining a hole through the attachment section and at least one of the blade layers, thereby creating a radial conduit in liquid communication with the channel.

In embodiments, the hole is machined through only one of the blade layers.

In embodiments, the radial conduit and an inclined section of a longitudinal conduit are machined starting at a circumferential location of an attachment body of the attachment section, and are subsequently covered to create a closed conduit between the radial conduit and the inclined section.

Machining the radial conduit and the inclined section from the same circumferential location causes them to be in liquid communication. The opening required for and created by the machining process is then closed.

In embodiments, the radial conduit and the inclined section of the longitudinal conduit are covered by fitting a ring around the attachment body.

Such a ring is simple to manufacture and keeps the symmetry of the blade in balance, which is advantageous with regard to its oscillation.

In other embodiments, the conduits are sealed by a screw, or by welding or by another means for closing off an opening.

According to an aspect of the invention, a robotic system is provided, configured to be equipped with a cutting tool as described herein, the robotic system being programmed to apply the tool to machine an object or workpiece.

In embodiments, the workpiece is a piece of animal or human tissue, in particular bone.

In embodiments, the robotic system is configured to supply the cutting tool with a fluid coolant while machining the workpiece.

The tool being internally cooled allows for a continuous cooling of the tool in a more efficient manner and with a better control of the cooling and thus of the temperature of the tool. This in turn allows for longer machining time windows.

Longer machining time windows in turn allow for machining the workpiece without withdrawing the tool, which would otherwise re-inserting the tool, leading a loss of precision. Furthermore, different functions using the same tool can be implemented without withdrawing the tool. Such functions can be cutting, sawing filing, cooling, and aspiration of material.

Combination of the tool with a robot manipulator allows for a controlled cutting or machining of three-dimensional cuts and shapes, respectively.

In embodiments, the robotic system includes a manipulator arm to which the tool is attached and by which the tool is movable, and wherein the tool is provided with cooling fluid through the manipulator arm, in particular wherein a cooling fluid conduit is arranged inside a casing of at least one most distal link of the manipulator arm.

In embodiments, the robotic system is programmed to apply the tool to machine the workpiece in an uninterrupted sequence, without withdrawing the tool from a region in which it is applied to the workpiece.

In embodiments, the robotic system is programmed to apply the tool to machine the workpiece using two or more different functions of the tool without withdrawing the tool, in particular wherein the functions are cutting, sawing filing, and aspiration of material.

In embodiments, the robotic system is programmed to apply the tool to machine different sides of the workpiece, in particular surfaces of the workpiece whose surface normal are oriented at an angle of more than forty-five degrees or more than ninety degrees relative to one another.

That is, the tool is used to machine two or more different sides of the workpiece.

In embodiments, the robotic system is programmed to apply the tool to machine the workpiece in an uninterrupted sequence of at least two minutes or three minutes or four minutes or five or six minutes.

In embodiments, the tool is shaped to include the function of at least two of a file, a saw, or a knife.

For example, the tool can include a file and a saw, or a saw and a knife, etc. This allows to apply the tool without the need to interrupt the machining operation and to withdraw the tool.

In embodiments, the tool is shaped to include at least two variants of the same function but with different parameters.

For example, the tool can include a rough file and a fine file, or a rough saw and a fine saw.

In embodiments, the robotic system includes a sensing unit configured to measure a tool force exerted by the tool on the workpiece, and being configured to control a movement of the tool according to the measured tool force.

This makes it possible to control the movement of the tool in order to maintain a desired machining force. This in turn can be used to optimise machining speed and/or prevent excessive heating of the tool.

In embodiments, the robotic system includes a coolant supply unit configured to provide cooling fluid to the tool intermittently, in particular with first time durations in which cooling fluid is provided alternating with second time durations in which no cooling fluid is provided, in particular wherein a time period after which the first time durations occur lies between one and ten seconds, in particular between two and five seconds.

In other words, the first time durations in which cooling fluid is provided correspond to pulses of cooling fluid, and the pulses can be repeated with a period length according to the time period.

The flow of cooling fluid being intermittent prevents a cushion of fluid being created and maintained between the tool and the workpiece and thereby impairing operation of the tool. During a cooling fluid pulse, debris from the tool's operation can be washed away.

In embodiments, the robotic system or the coolant supply unit includes a sensing unit configured to measure a tool temperature and a control unit configured to control a flow of cooling fluid to the tool according to the measured tool temperature.

This allows to adapt the flow of coolant to the actual cooling requirements which in turn depend on the working condition between the tool and the workpiece.

Controlling the flow can be done by continuously varying the flow, or with discrete steps, in particular by turning the flow on and off, that is, by a pulsating flow. In the latter case, the controller can set a pulse width, or a pulse frequency or coolant pulses.

In embodiments, the sensing unit is configured to determine the tool temperature on the basis of a driver frequency of oscillation of the tool, the driver frequency of oscillation being continuously adapted to an actual resonance frequency of the tool.

This is based on the observation that the temperature of the tool affects the mechanical properties of the tool, in particular its length, and thereby an actual resonance frequency of the tool. The actual resonance frequency can be determined by using an ultrasound driver that automatically adapts its operating frequency to the actual resonance frequency of the tool. This automatic frequency adaptation is a feature of many existing ultrasound drivers.

As a result, the flow of coolant can be controlled according to the actual operating frequency of the ultrasound driver.

Providing cooling fluid to the tool intermittently, and/or controlling the flow of fluid and or measuring the temperature as described herein can also be implemented by means of a coolant supply unit that is part of a setting in which no robotic system is present.

BRIEF DESCRIPTION OF THE DRAWINGS

The subject matter of the invention will be explained in more detail in the following text with reference to exemplary embodiments which are illustrated in the attached drawings, which schematically show:

FIG. 15-16 further embodiments in an elevated view;

FIG. 17 a first blade layer alone and in combination with a second blade layer, for a further embodiment; and FIG. 18-19 an embodiment with an axial hollow needle for guiding fluid into a flat section of the tool.

DETAILED DESCRIPTION OF THE INVENTION

In principle, identical parts are provided with the same reference symbols in the figures.

Figure 1:
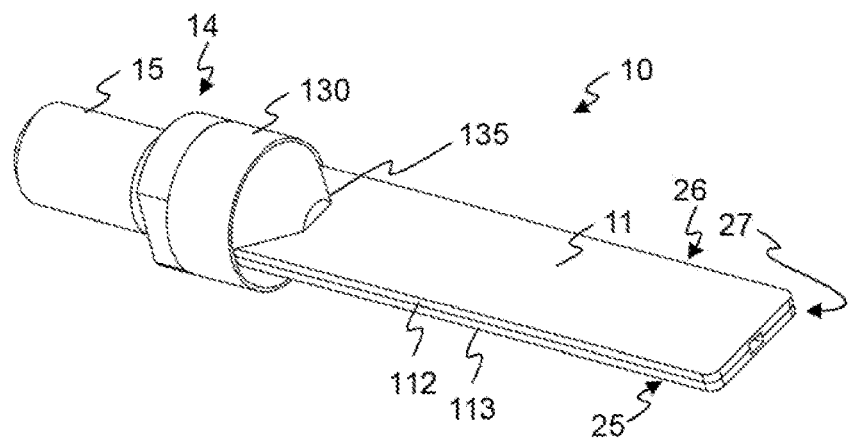
FIG. 1-4 different views and sections of a blade according to one embodiment.
Figure 2:
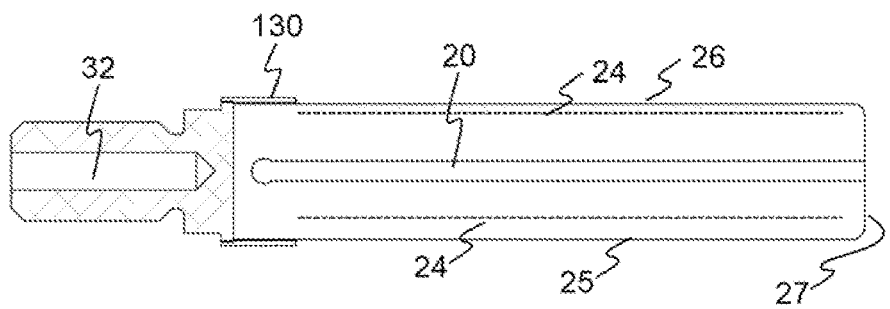
Figure 3:
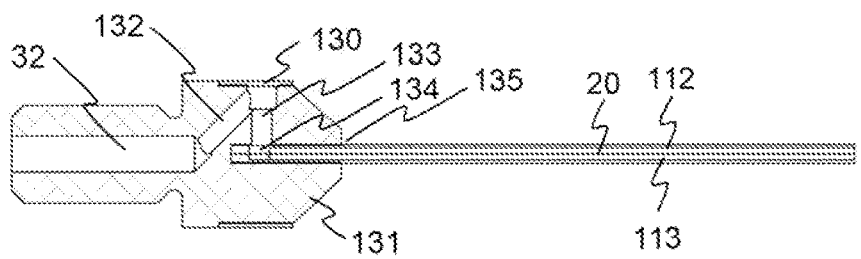
Figure 4:
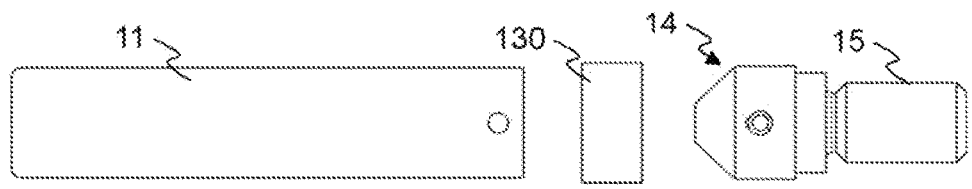

FIG. 1-4 show different views and sections of a blade according to one embodiment. FIG. 1 shows a perspective view, FIG. 2 a longitudinal section with a view normal to a plane in which the blade 10 lies, FIG. 3 a longitudinal section with a view parallel to said plane, and FIG. 4 an exploded view.

The blade 10 includes a flat section 11 held by an attachment section 14. The flat section 11 constitutes a working section, that is, for cutting or abrading material, in particular bone and/or soft tissue. The flat section 11 includes a first blade layer 112 and second blade layer 113, being flat pieces preferably of metal. The two layers are bonded to one another, for example by welding. Corresponding weld lines 24 are represented by dotted lines. They run adjacent to a longitudinal first edge 25 and second edge 26. At least one of the layers includes a recess forming a channel 20 along the length of the flat section 11. The channel 20 can serve to guide, distribute and dispense coolant provided via the attachment section 14.

By means of the attachment section 14, the blade 10 can be attached to an ultrasonic vibration generator, for example by means of an outer thread 15, as shown, or an inner thread.

The transporting and dispensing of the fluid can be enhanced or facilitated by a pumping effect caused by ultrasonic oscillations of the blade 10 and in particular the flat section 11.

At a proximal end, the flat section 11 is clamped in a clamping slit 135 located in an attachment body 131 that is part of the attachment section 14.

The flat section 11 can be clamped in the clamping slit 135 by heating the attachment section 14, inserting the flat section 11 while the attachment section 14 is hot, and cooling the attachment section 14 again, thereby creating a press fit. In addition or alternatively, this connection can be made by bonding, such as welding, soldering, gluing, etc.

A ring 130 is fitted around the attachment body 131 and can add to a clamping force exerted on the flat section 11 by the attachment body 131. The ring 130 also serves to close a conduit for leading a fluid from a longitudinal conduit 32 in the attachment section 14 to the channel 20 in the flat section 11 (or in the other direction). The conduit is shaped by machining, starting at a point on the circumference of the attachment body 131, a radial conduit 133 leading into the flat section 11, and an inclined conduit section 132 that becomes part of the longitudinal conduit 32. After machining, the two conduits are closed off by means of the ring 130.

By means of the radial conduit 133, fluid is guided into the channel 20 from the side of one of the first blade layer 112 and second blade layer 113. This is more reliable and easier to accomplish than guiding the fluid trough the relatively thin proximal edge of the flat section 11.

The main parts of the blade 10, such as the flat section 11 and attachment section 14 and the ring 130 typically are manufactured of titanium and/or medical grade stainless steel. Some parts can be made of an aluminium alloy.

In embodiments, the flat section 11 and ring 130 are made of stainless steel and the attachment section 14 is made of stainless steel as well. When creating the press fit, the attachment section 14 is heated for example to around 400 to 500 degrees Celsius before inserting the flat section 11.

The channels 20 or corresponding recess or recesses can be shaped by etching, laser engraving, electrochemical machining and other methods.

Figure 5:
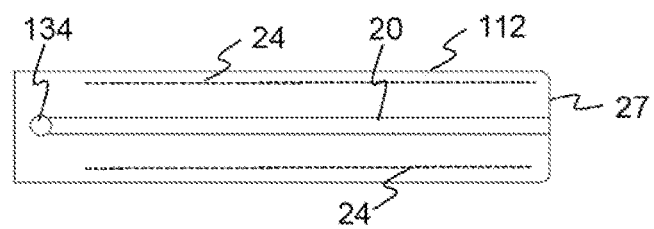
FIG. 5-8 blade layers with different channel shapes.
Figure 6:
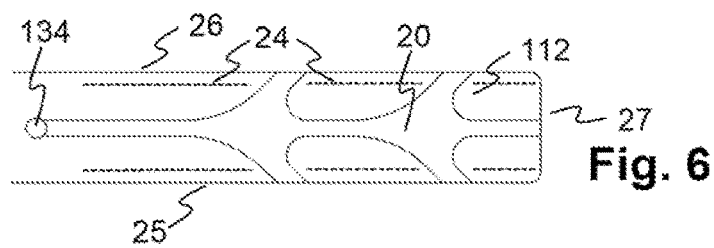
Figure 7:
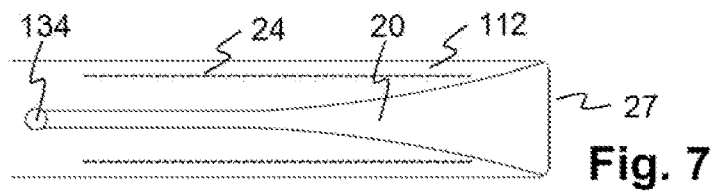
Figure 8:
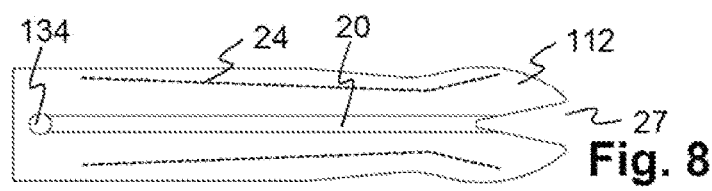

FIG. 5-8 show blade layers with different channel and blade shapes. These examples illustrate the variety that can easily be achieved with regard to both the shape of the blade 10 and the shape of the channel 20. The shapes shown represent a recess in the first blade layer 112, the second blade layer 113 or both. The weld lines 24 are adapted according to the shape of the channel 20 and/or an outer contour of the blades. FIG. 5 shows a straight channel 20 leading from the blade inlet 134 to the front edge 27. FIG. 6 shows a channel 20 branching out to side channels leading to outlets along the first edge 25 and second edge 26, in addition to an outlet at the front edge 27. The weld lines 24 are interrupted where they cross the side channels. FIG. 7 shows a channel 20 leading from the blade inlet 134 to the front edge 27, widening towards the front edge 27. FIG. 8 shows flat section 11 with the front edge 27 shaped to perform a cutting action when oscillating, with a straight channel 20 leading from the blade inlet 134 to the front edge 27.

In embodiments not shown, two or more separate channels 20 are present. The separate channels can be used for evenly distributing coolant along the flat section 11. Alternatively or in addition, they can be used for different purposes: at least one coolant channel can be used for providing coolant to the flat section 11, and at least one suction channel can be used for sucking material from the region surrounding the flat section 11.

The two channels 20 typically are laterally displaced relative to one another. Two radial conduits 133 can be present, each leading to one of the two channels. The two radial conduits 133 can lead into the flat section 11 from the same side, or from opposite sides. Thus, in the latter case, one of the radial conduits 133 leads through a blade inlet 134 in the first blade layer 112, and the other one through a blade inlet 134 in the second blade layer 113. In other embodiments, one of the channels is in liquid communication with an axially directed (or longitudinal) channel within the attachment body 131.

FIG. 1-8 show edges of the blade in a simplified representation as being blunt. In real embodiments, the edges can be sharp and/or include serrations or notches, as shown below.

FIGS. 9-16 show transverse sections and elevated views of a flat section 11 of the blade 10, typically with longitudinal weld lines 24 adjacent to a first longitudinal edge 25, and a second longitudinal edge 26. The principal surface of the flat section 11 typically includes structured surfaces 23 such as teeth or grooves. The Figures show channels 20 shaped in only one of the layers, but it is understood that in each case they can be shaped in both.

Generally, a first longitudinal edge 25, second longitudinal edge 26 and front edge 27 can be shaped differently or in the same way, with notches 21, teeth, serrations or as blades, or with a combination of these and even other elements. The shape of the channel 20 or channels 20 is adapted accordingly.

Figure 9:
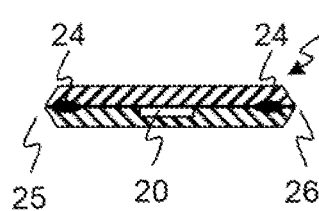
FIG. 9-14 further embodiments in a respective cross section and elevated view.
Figure 10:
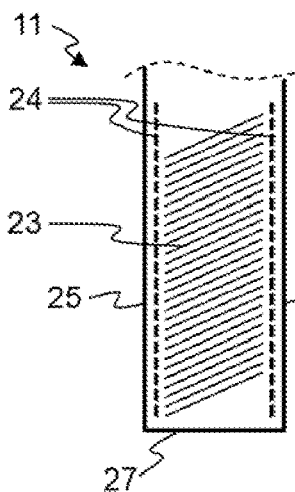

FIGS. 9-10 show a transverse section and an elevated view of a flat section of the blade 10 with a single longitudinal channel. Corresponding shapes of the channel 20 can be as in FIG. 5 or 7.

Figure 11:
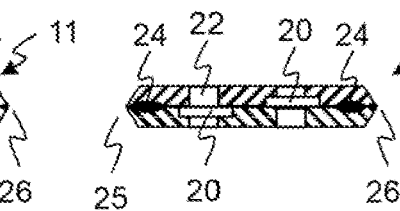
Figure 12:
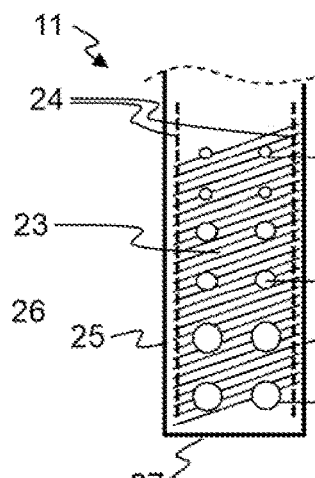

FIGS. 11-12 show a transverse section and an elevated view of a flat section of the blade 10 wherein holes 22 are present, constituting openings to a single channel 20 (not illustrated) or two parallel channels 20. Each channel is shaped in a corresponding one of the two layers. Consequently, only a single type of layer needs to be manufactured. Edges of the holes can have a cutting effect. The diameter of the holes 22 is varied in the longitudinal direction in order to control the distribution of the flow of coolant along the length of the flat section 11. This can server to evenly distribute the flow.

Figure 13:
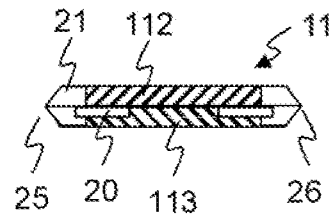
Figure 14:
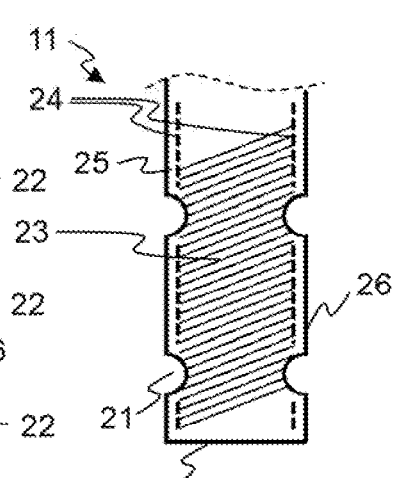

FIGS. 13-14 show a transverse section and an elevated view of a flat section of the blade 10 wherein notches 21 are present in one or more of the first edge 25 and/or second edge 26 and/or front edge 27. The notches 21 serve on the one hand as serrations for cutting, and on the other hand as conduits guiding coolant out of the channel 20. A corresponding shape of the channel 20 can be as in FIG. 6.

FIGS. 9 to 14 show elements such as weld line 24, structured surface 23, holes 22 and notches 21 separately. In other embodiments, they are combined. For example, according to FIG. 15, notches 21 are present at a first edge 25, holes 22 are arranged near a second edge 26, and the second edge 26 can be shaped as a cutting edge. Correspondingly shaped channels 20 (not illustrated) are arranged to be in fluid connection with the holes 22 and notches 21.

In further embodiments, two or more weld lines 24 are present, according to the shape of channels 20 between them. Weld lines 24 can be used to stiffen the structure of the flat section 11 and thereby modify its natural frequency of oscillation, in particular by reducing parasitic lateral oscillations. FIG. 16 shows weld lines 24 in a fishbone pattern.

FIG. 17 shows a further embodiment, in which the first blade layer 112 and second blade layer 113 each include part of the attachment section 14, which when joining the layers forms a cylindrical and in particular tubular attachment section 14. The tubular section is in liquid communication with one or more channels 20 (not illustrated). The two layers can be manufactured by moulding or deep drawing.

FIGS. 17 and 19 show a further embodiment, in which coolant is guided through the flat section 11 in a hollow needle 28. The hollow needle extends in the longitudinal direction of the blade 10. In the flat section 11, it lies in within the channel 20. For the purpose of illustration, the figures show a gap between the hollow needle 28 and parts of the flat section 11. In practice however, the hollow needle 28 can be arranged and/or be shaped to be in close contact with the flat section 11, that is, the first blade layer 112 and second blade layer 113, in order to allow for heat transfer. In embodiments, a filler with good thermal conductivity is arranged between the hollow needle 28 and the flat section 11. The hollow needle 28 extends from the flat section 11 into the attachment section 14, in which it can be seated by, for example, a press fit. This allows for a liquid-tight conduit from the attachment section 14 into the flat section 11.

Cut-outs such as holes 22 and notches 21 can be machined, for example, by stamping or laser cutting, in particular at the same time when the shape of the flat section 11 or the layers is machined. Other, smaller structures, such as the structured surface 23, can be created by laser engraving or etching. Cut-outs and the other structures can be created on the first blade layer 112 and second blade layer 113, before welding them against one another, or afterwards.

The structured surface 23 can be created in the process of flattening the blank to form the flat section 11.

The blade 10 can be operated with an ultrasound driver having an operating frequency of 26 kHz.

While the invention has been described in present embodiments, it is distinctly understood that the invention is not limited thereto, but may be otherwise variously embodied and practised within the scope of the claims.

The invention claimed is:

1. An ultrasonic cutting tool, for use in an ultrasonic instrument, the tool being a blade comprising:
   a flat section manufactured from at least a first blade layer and second blade layer, the first and second blade layer each being a flat plate arranged in parallel to one another and bonded to one another or to one or more intermediate layers,
   wherein the flat section is joined to an attachment section for attaching the blade to an ultrasonic generator,
   wherein the flat section is held in a clamping slit of the attachment section,
   wherein the flat section, in a region in which it is held in the clamping slit, comprises a hole constituting a blade inlet in liquid communication with a channel in at least one of the first blade layer and the second blade layer, and
   wherein the attachment section comprises a radial conduit in communication with the blade inlet.

2. The tool of claim 1, wherein the first blade layer or the second blade layer or both comprise, on a face oriented towards the other blade layer, a recess defining a channel suited to guide a fluid along the blade.

3. The tool of claim 2, wherein the recess is created by a subtractive process.

4. The tool of claim 1, wherein first blade layer and second blade layer are welded to one another.

5. The tool of claim 1, wherein the flat section comprises one or more weld lines, by which the first blade layer and second blade layer are welded to one another on faces at which the first blade layer and second blade layer lie against one another.

6. The tool of claim 5, wherein the weld lines run along a longitudinal direction in which the flat sections.

7. The tool of claim 6, wherein one weld line runs adjacent to a first longitudinal edge and another weld line runs adjacent to a second longitudinal edge of the flat section.

8. The tool of claim 5, wherein the first blade layer or the second blade layer or both comprise, on a face oriented towards the other blade layer, a recess defining a channel suited to guide a fluid along the blade, and wherein the weld lines are interrupted at locations where they cross a section of the channel.

9. The tool of claim 1, wherein the attachment section has a rotationally symmetric body.

10. The tool of claim 1, wherein the radial conduit is in liquid communication with a longitudinal conduit.

11. The tool of claim 1, wherein the attachment section comprises an attachment body in which the clamping slit is arranged, and a ring is arranged around the attachment body.

12. The tool of claim 1, wherein the attachment section comprises an attachment body in which the clamping slit is arranged, and a ring is arranged around the attachment body and wherein the ring serves as a seal for the radial conduit.

13. The tool of claim 1, wherein a hollow conduit is arranged in the channel and extends from the flat section into the attachment section, with a liquid-tight connection between the hollow conduit and the attachment section.

14. The tool of claim 1, wherein the attachment section comprises an internal thread or an external thread.

15. The tool of claim 1, wherein the flat section comprises one or more holes in fluid communication with the one or more channels.

16. The tool of claim 1, wherein one or more edges of the flat section comprise teeth.

17. The tool of claim 1, wherein one or more edges of the flat section are machined to constitute a cutting edge.

18. The tool of claim 1, wherein one or more edges of the flat section comprise one or more notches constituting openings that are in liquid communication with the one or more channels.

19. The tool of claim 1, wherein an outer surface of the flat section is machined to comprise a structured surface.

20. The tool of claim 19, wherein the structured surface comprises teeth or grooves.

21. The tool of claim 1, wherein at least one of the first blade layer and the second blade layer is made of metal or a ceramic material.

22. A method for manufacturing a blade according to claim 1, comprising the steps of:
providing a first blade layer and a second blade layer;
bonding the first blade layer and second blade layer to one another, thereby forming a flat section of the blade;
joining the flat section to an attachment section by clamping the flat section in a clamping slit of the attachment section.

23. The method of claim 22, wherein at least one of the first blade layer and second blade layer comprises a recess or a cut-out to serve as a channel in the blade; and wherein when bonding the first blade layer and second blade layer to one another, the recess or cut-out is arranged between the first blade layer and the second blade layer.

24. The method of claim 22, wherein
when bonding the first blade layer and second blade layer to one another, at least one hollow needle is arranged between two of the layers; and
when joining the flat section to the attachment section, a section of the hollow needle extending out of the flat section is inserted into the attachment section and a fluid-tight connection is established between them.

25. The method of claim 22, wherein joining the flat section to the attachment section comprises heating the attachment section, inserting the flat section into the clamping slit of the attachment section, and cooling the attachment section.

26. The method of claim 22, comprising the further step of machining a hole through the attachment section and at least one of the blade layers, thereby creating a radial conduit in liquid communication with the channel.

27. The method according to claim 26, wherein the radial conduit and an inclined section of a longitudinal conduit are machined starting at a circumferential location of an attachment body of the attachment section, and are subsequently covered to create a closed conduit between the radial conduit and the longitudinal conduit.

28. The method according to claim 27, wherein the radial conduit and the inclined section of the longitudinal conduit are covered by fitting a ring around the attachment body.

29. The method according to claim 22, wherein the step of providing the blade layers comprises creating in at least one of the layers a recess defining a channel by means of photo-etching, preferably in a roll-to-roll process.

30. A method for manufacturing a blade according to claim 1, comprising the steps of:
providing a first blade layer and a second blade layer and one or more further blade layers;
bonding the first blade layer and second blade layer and the one or more further blade layers to one another, thereby forming a flat section of the blade;
joining the flat section to an attachment section by clamping the flat section in a clamping slit of the attachment section.

31. A robotic system equipped with a cutting tool according to claim 1, the robotic system being programmed to apply the cutting tool to machine an object or workpiece.

32. The robotic system according to claim 31, comprising a manipulator arm to which the cutting tool is attached and by which the cutting tool is movable, and wherein the cutting tool is provided with cooling fluid through the manipulator arm.

33. The robotic system according to claim 31, programmed to apply the cutting tool to machine the workpiece in an uninterrupted sequence, without withdrawing the tool from a region in which it is applied to the workpiece.

34. The robotic system according to claim 33, programmed to apply the cutting tool to machine a workpiece using two or more different functions of the cutting tool without withdrawing the tool.

35. The robotic system according to claim 31, programmed to apply the cutting tool to machine different sides of the workpiece.

36. The robotic system according to claim 31, programmed to apply the cutting tool to machine the workpiece in an uninterrupted sequence of at least two minutes or three minutes or four minutes or five or six minutes.

37. The robotic system according to claim 31, wherein the cutting tool is shaped to serve as at least two of a file, a saw, or a knife.

38. The robotic system according to claim 37, wherein the cutting tool is shaped to comprise at least two variants of the same function but with different parameters.

39. The robotic system according to claim 31, comprising a sensing unit configured to measure a tool force exerted by the cutting tool on the workpiece, and being configured to control a movement of the tool according to a measured tool force.

40. The robotic system according to claim 31, configured to provide cooling fluid to the cutting tool intermittently.

41. The robotic system according to claim 31, comprising a sensing unit configured to measure a tool temperature and a control unit configured to control a flow of cooling fluid to the cutting tool according to a measured tool temperature.

42. The robotic system according to claim 41, wherein the sensing unit is configured to determine the tool temperature based upon a driver frequency of oscillation of the cutting tool, the driver frequency of oscillation being continuously adapted to an actual resonance frequency of the tool.

43. The robotic system according to claim 31, configured to control a flow of cooling fluid to the cutting tool according to an actual operating frequency of an ultrasound driver.

* * * * *